July 16, 1946.  T. E. McFALL  2,404,140
PISTON RING
Filed Jan. 3, 1944

Inventor
Thurlow E. McFall
By Liverance and
Van Antwerp
Attorneys

Patented July 16, 1946

2,404,140

UNITED STATES PATENT OFFICE 2,404,140
PISTON RING
Thurlow E. McFall, Sparta, Mich.
Application January 3, 1944, Serial No. 516,828
8 Claims. (Cl. 309—44)

This invention relates to piston rings used in internal combustion engines. It is a primary object and purpose of the present invention to provide a simple, economical, easily installed and durable piston ring made entirely of steel, preferably, and which is to be used in the oil grooves of internal combustion engines for scraping excess lubricating oil from the walls of the cylinders and returning it to the crankcase of the engine.

The invention which I have devised for the ring consists of two parts with which generally there is associated an expander spring in service. However the ring is complete and operative without the expander spring which merely provides additional pressure to press the edges of the ring parts against the walls of a cylinder for oil scraping, said ring without the expander having a degree of pressure against the cylinder walls which is increased by the use of an expander spring. Both of the parts of the ring are readily and easily made from suitable sheet metal, of which steel is an example, and which preferably will be used.

An understanding of the invention may be had from the following description taken in connection with the accompanying drawing, in which Fig. 1 is a plan view of one of the ring members used in the piston ring of my invention.

Like reference characters refer to like parts in the different figures of the drawing.

Figure 4:
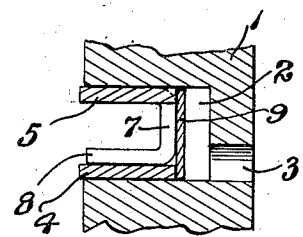
Fig. 4 is a fragmentary vertical section enlarged showing the installation of a complete ring in the oil groove of a piston.
Figure 3:
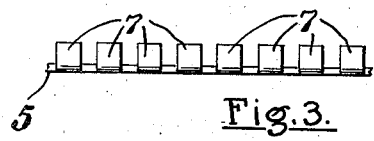
Fig. 3 is a fragmentary edge view of the completed ring member.
Figure 6:
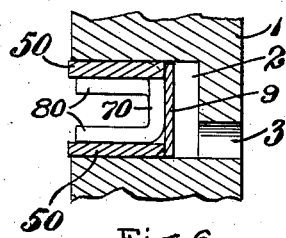
Fig. 6 is a section like Fig. 4 illustrating the installation of a complete ring using the ring parts of Fig. 5 in the oil groove of a piston.

The ring of my invention is designed for use with internal combustion engine pistons 1 which, as shown in Figs. 4 and 6, have an oil groove or grooves 2 for receiving piston rings generally located below other piston ring grooves in the piston in which conventional compression rings usually of cast iron are installed. The oil groove 2 has drainage openings 3 from the bottom thereof to the interior of the piston for passage of oil to the engine crankcase.

The ring construction of two parts has, for one of its parts, as in Fig. 4, a thin steel rail 4 ordinarily approximately of .025" stock which has a parting at one side and which when the parting is closed takes a substantially circular form to bear at its outer edge against the wall of a cylinder in which it is installed. Such ring bears with some pressure against the wall of a cylinder as a tension is created in it when it is closed at its parting as must be done when it is placed within a cylinder.

The other ring member is made from a length of flat metal which at one side is continuous from one end to the other, as indicated at 5, while at the opposite side edge it is formed to provide a plurality of spaced apart tongues 6. The tongues 6 are all bent upwardly and then in a direction parallel to and spaced from the section 5 providing substantially vertical sections 7 and terminal sections 8 parallel to the part 5.

Figure 1:
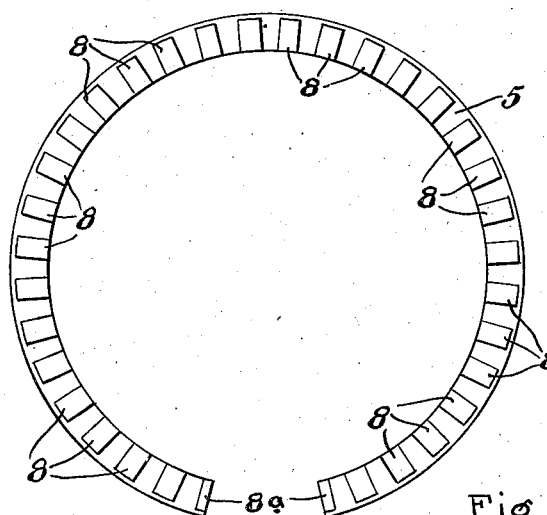

When installed within a ring groove 2 of a piston normally a conventional expander spring 9 is placed within the groove, the rail 4 is then placed in the groove and the ring member having the continuous rail section 5 is located over the rail 4 with the terminal parts 8 of the tongues bearing against the upper side of said rail 4. This provides a ring which has the lower rail 4 and the upper rail section 5, the outer edges of which are substantially flush with each other. The vertical legs 7 of the tongues 6 which have been bent as described bear at their inner sides against the expander spring 9. This ring member preferably at its parting, as shown in Fig. 1, has two narrower tongues each approximately one-half of the width of the tongues 6 immediately at the ends of the ring, one at each side of the parting so that when the ring is closed it is supported at each side of the parting by a section 8a bearing against the rail 4.

With this construction there are ample venting spaces between the parts 7 and 8 of adjacent tongues for the passage of oil scraped from a cylinder wall and entering between rail 4 and the rail section 5. The expander spring in normal practice has vent passages through it for the oil to go to the bottom of the ring groove and thence through the passages at 3. It is of course evident that so far as the invention is concerned the rail 4 may be placed above the ring member consisting of the rail section 5 and the tongue sections 7 and 8, the invention being the same if the two parts of the ring as shown in Fig. 4 are reversed in position.

Figure 2:
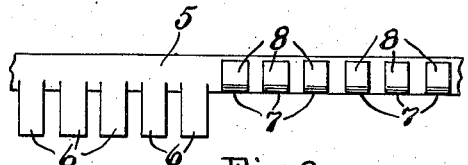
Fig. 2 is a fragmentary plan of a length of flat metallic material from which the ring member shown in Fig. 1 is made, a part of the tongues of said member being shown as formed in blank and others in the completely fabricated state.
Figure 5:
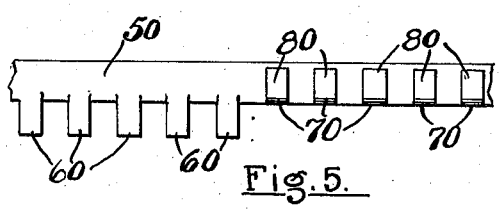
Fig. 5 is a view similar to Fig. 2 showing a modified form of ring member, two of which are used for a complete ring.
Figure 7:
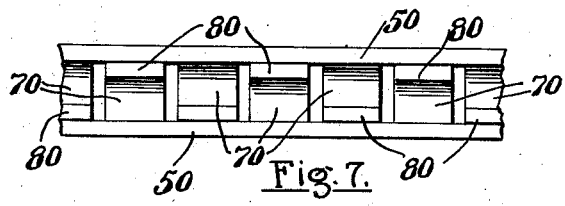
Fig. 7 is a fragmentary outer edge view of the complete ring.

In Figs. 5, 6 and 7, the piston ring consists of two identical ring parts each produced in a manner similar to the upper rail part of the ring shown in Fig. 4. A length of flat metal has a continuous rail section 50 at one side edge from which spaced tongues 60 extended from the opposite side edge, differing only from the construction shown in Fig. 2 in that the tongues 60 are spaced farther apart than the tongues 6. The width of the spaces between adjacent tongues 60 is greater than the width of a tongue 60. The tongues are bent in a similar manner providing vertical sections 70 and horizontal terminal portions 80. Two of such ring members, as shown in Figs. 5 and 7 are placed in a ring groove 2 against the expander spring 9, one being inverted in position with respect to the other, and with the parts 70 and 80 of the return bent tongue 60 located side by side in relation to each other. The terminal sections 80 bear respectively against the lower side of the upper rail section 50 and the upper side of the lower rail 50 as shown in Fig. 6. In such construction the distance between the tongues 60 being greater than the width of the tongue space is provided for the passage of oil collected by the scraping edges of the rail sections 50 in bearing against the cylinder walls.

The piston ring constructions described provide a composite ring of a minimum of parts which are very readily manufactured at lowest cost both of material and labor, and which are installed in the ring groove without danger of breakage which many times occurs with ring parts of narrow cross section made of cast iron or similar relatively fragile material. Economy in manufacture is attained because of a minimum of material and of parts needed. The ring is of light weight and the inertia effects in their use in pistons is greatly reduced.

The invention is defined in the appended claims and is to be considered comprehensive of all forms of structure coming within their scope.

I claim:

1. In a piston ring, a ring member comprising, an integral flat rail section of thin metal of a curved form having a parting at one side, said rail section becoming substantially circular at its outer periphery when the parting is closed, and a plurality of spaced tongues extending from the inner edges of said rail section, said tongues being bent substantially at right angles to said rail section for a short distance and thereafter bent to lie substantially parallel to and spaced from said rail section, said tongues being substantially equally spaced throughout their lengths as specified.

2. In a piston ring, a ring member of thin flat metal comprising, a flat integral rail section of a curved form having normally a space or parting between its ends, said rail section when the parting is substantially closed having an outer circular periphery, a plurality of spaced tongues extending from the inner edges of said rail section and bent at a short distance from said inner edges of the rail section to extend all in the same direction at right angles to said rail section for a distance and then return-bent into substantial parallelism with and spaced from the adjacent side of the rail section, said tongues being substantially equally spaced throughout their lengths, the free ends of said tongues being spaced inwardly a short distance from the outer edges of said flat rail section.

3. A piston ring comprising, a ring member of thin flat metal having a substantially horizontal continuous rail section bent into substantially circular form and parted at one side, said parting being adapted to be substantially closed when the piston ring is within a cylinder, said rail section having a plurality of spaced tongues integral with and extending from its inner edges, said tongues being bent to provide terminal sections substantially parallel to and spaced from said rail section, and a flat ring member of thin sheet metal located against the terminal sections of said tongues in parallelism to the rail section of the first ring member.

4. A construction containing the elements in combination defined in claim 3, said flat ring member having a width equal to the distance from the outer edge of said rail section to the rear faces of the vertical sections of said tongues.

5. A construction containing the elements in combination defined in claim 3, said flat ring member having a width equal to the distance from the outer edge of said rail section to the rear faces of the vertical sections of said tongues, an expander spring bearing against the inner edge of said flat rail and against the rear sides of the vertical sections of said tongues, the outer edges of said rail and of said rail section being in substantially vertical alinement.

6. A piston ring comprising an integral flat rail section 5, a plurality of tongues extending from the inner edges thereof and bent to form substantially vertical sections 7 and terminal sections 8 spaced from and paralleling the rail section 5, and an integral side rail 4 located against the outer sides of said terminal sections 8.

7. A piston ring comprising, two identical ring members each of thin flat metal of substantially circular form and parted at one side to provide a continuous side rail section except at said parting, tongues equally spaced throughout their lengths integral with and extending from the inner edges of said side rail sections, said tongues being bent at right angles to their respective rail sections for a short distance and then bent again to provide terminal sections substantially parallel to and spaced from their respective rail sections, said ring members being located one over the other with the rail sections thereof bearing against the outer sides of the terminal sections of the tongues of the opposite rail section, and with said tongues of one ring member located in the spaces between the tongues of the other ring member.

8. A vented oil groove piston ring having two members each including a flat side rail portion of substantially circular form parted at one side, said rail portions adapted to bear against the upper and lower sides of a piston ring groove respectively, and tongues connected integrally with each side rail portion and extending from the inner edges thereof bent to extend toward the opposite side rail and then bent to pass within said opposite side rail and against which said opposite side rail bears at its inner side, as specified.

THURLOW E. McFALL.